(12) United States Patent
Jiang et al.

(10) Patent No.: US 10,919,378 B2
(45) Date of Patent: Feb. 16, 2021

(54) SUPPORTING ASSEMBLY FOR HOLLOW TANK BODY AND FORMING METHOD FOR HOLLOW TANK BODY

(71) Applicant: YAPP AUTOMOTIVE SYSTEMS CO., LTD, Yangzhou (CN)

(72) Inventors: Lin Jiang, Yangzhou (CN); Liang Liu, Yangzhou (CN); Weidong Su, Yangzhou (CN)

(73) Assignee: YAPP AUTOMOTIVE SYSTEMS CO., LTD, Yangzhou (CN)

( * ) Notice: Subject to any disclaimer, the term of this patent is extended or adjusted under 35 U.S.C. 154(b) by 193 days.

(21) Appl. No.: 16/317,561

(22) PCT Filed: Feb. 16, 2017

(86) PCT No.: PCT/CN2017/073723
§ 371 (c)(1),
(2) Date: Jan. 13, 2019

(87) PCT Pub. No.: WO2018/010427
PCT Pub. Date: Jan. 18, 2018

(65) Prior Publication Data
US 2019/0232780 A1 Aug. 1, 2019

(30) Foreign Application Priority Data

Jul. 15, 2016 (CN) .......................... 201610557887.3
Jul. 15, 2016 (CN) .......................... 201620746713.7

(51) Int. Cl.
*B60K 15/03* (2006.01)
*B29C 49/20* (2006.01)
*B29C 49/18* (2006.01)

(52) U.S. Cl.
CPC .............. *B60K 15/03* (2013.01); *B29C 49/18* (2013.01); *B29C 49/20* (2013.01); *B60K 2015/03032* (2013.01)

(58) Field of Classification Search
CPC ........ B29C 49/0047; B29C 2049/0057; B29C 2049/2013; B29C 2049/2021;
(Continued)

(56) References Cited

U.S. PATENT DOCUMENTS 6,135,306 A * 10/2000 Clayton ........... B60K 15/03177
220/501
6,138,859 A * 10/2000 Aulph .................... B60K 15/03
220/563
(Continued)

FOREIGN PATENT DOCUMENTS

| CN | 103507263 A | 1/2014 |
|----|-------------|--------|
| CN | 103930293 A | 7/2014 |

(Continued)

OTHER PUBLICATIONS

Partial machine translation of CN 105539125 A dated May 2016 obtained from the espace website. (Year: 2016).*

*Primary Examiner* — Robert B Davis
(74) *Attorney, Agent, or Firm* — Bayramoglu Law Offices LLC

(57) ABSTRACT

A supporting assembly for a hollow tank body includes a supporting body (2) and supporting ends (1) provided at two ends of the supporting body. The supporting ends are provided with stepped transition assemblies (4) connected to the supporting body. The supporting body is configured with a hollow structure. The supporting body includes a supporting main body (5) and a base (6). The supporting main body is configured with a cylindrical structure or a cylindrical structure with a corrugated structure in the middle. With this structure, the deformation of the hollow tank body under the
(Continued)

relatively high overpressure and the low negative pressure can be avoided, and the shape stability of the whole product can be enhanced. Meanwhile, the supporting structure needs less material, and has a light weight and lowered cost.

20 Claims, 5 Drawing Sheets

(58) Field of Classification Search
CPC ...... B29C 2049/2047; B29C 66/30325; B29C 66/532; B29C 66/61; B60K 2015/03032; B60K 15/03177; B29L 2031/7172
See application file for complete search history.

(56) References Cited

U.S. PATENT DOCUMENTS

| | | | |
|---|---|---|---|
| 6,338,420 B1* | 1/2002 | Pachciarz | B60K 15/03177 |
| | | | 220/4.13 |
| 2014/0158696 A1* | 6/2014 | Criel | B60K 15/067 |
| | | | 220/562 |
| 2016/0243930 A1* | 8/2016 | Criel | B60K 15/03177 |

FOREIGN PATENT DOCUMENTS

| | | | | |
|---|---|---|---|---|
| CN | 204249813 U | | 4/2015 | |
| CN | 104884292 A | | 9/2015 | |
| CN | 105538659 A | | 5/2016 | |
| CN | 105539125 A | * | 5/2016 | ....... B60K 15/03177 |
| CN | 106042904 A | | 10/2016 | |
| WO | WO-2014023053 A1 | * | 2/2014 | ........... B29C 69/001 |

\* cited by examiner

SUPPORTING ASSEMBLY FOR HOLLOW TANK BODY AND FORMING METHOD FOR HOLLOW TANK BODY

CROSS REFERENCE TO RELATED APPLICATIONS

This application is the national phase entry of International Application No. PCT/CN2017/073723, filed on Feb. 16, 2017, which is based upon and claims priority to Chinese Patent Application No. 201610557887.3, filed on Jul. 15, 2016 and Chinese Patent Application No. 201620746713.7, filed on Jul. 15, 2016, the entire contents of which are incorporated herein by reference.

TECHNICAL FIELD

The present invention relates to a supporting assembly for a hollow tank body, particularly to a supporting assembly for a hollow tank body and a method for producing the hollow tank body, which pertains to the technical field of fuel tank manufacturing.

BACKGROUND

Currently, the conventional plastic fuel tank can withstand an internal pressure ranging from −2 kPa to 6 kPa during the life cycle. However, with the development of automotive technology, in some special cases, such as hybrid vehicles, the plastic fuel tank is required to have a higher pressure bearing capacity, and the internal pressure required to be withstood is expanded to the range from −15 kPa to 40 kPa. In this case, the strength of the traditional structural design for the conventional plastic fuel tank is far from meeting the new pressure bearing requirements. As a result, the fuel tank is prone to deformation and fracture, thereby causing fuel leakage and serious potential safety hazards. In order to improve the structural strength of the conventional plastic fuel tank, in the prior art, a layer of mesh structure externally surrounding around the fuel tank is provided. However, although this structural design can limit the deformation of the tank body caused by an expansion due to the increasing of internal pressure, when the interior of the tank body is subjected to a negative pressure, the structural deformation caused by the inward contraction of the tank body cannot be avoided. Another common method for increasing the strength of a hollow tank body is to arrange a plurality of columns inside the hollow tank body. These columns connect the upper and lower inner walls of the hollow tank body. The middle of the column often contains a metal piece to strengthen the column, so that it can withstand a required high pressure. The column having the metal piece is costly and requires anti-static treatment. Since the middle portion of the column contains metal, the strength of the middle portion is higher than that of the two ends, which makes the connections of the two ends of the column prone to failure. In addition, with the high density of the metal, the weight of the hollow tank body will be added. Those skilled in the art have been trying new solutions, but these problems have not been well solved.

SUMMARY

In view of the problems existing in the prior art design, the present invention provides a supporting assembly for a hollow tank body and a method for producing the hollow tank body. The structure can resist the deformation of the hollow tank body under a relatively high overpressure and a relatively low negative pressure, thereby enhancing the shape stability of the whole product. Meanwhile, the supporting structure needs less material, and has lighter weight and lower cost.

In order to realize the above objective, the technical solution of the present invention is as follows. A supporting assembly for a hollow tank body includes a supporting body and supporting ends provided at two ends of the supporting body, wherein each supporting end is provided with a stepped transition assembly connected to the supporting body.

As an improvement of the present invention, the supporting body is configured with a hollow structure.

As an improvement of the present invention, the supporting body includes a supporting main body and a base.

As an improvement of the present invention, the supporting main body is configured with a cylindrical structure or a cylindrical structure with a corrugated structure in a middle.

As an improvement of the present invention, the base is configured with a round shape, an elliptical shape, or a square shape, and the base is provided with base holes. An edge is provided with through holes at an equal interval from each other. When the base is connected to the supporting ends, a part of a molten material of the supporting ends can pass through the through holes to form a protrusion structure after the molten material is cooled, thereby further improving the connection strength between the supporting ends and the supporting body.

As an improvement of the present invention, each supporting end includes an end surface of a round shape, an elliptical shape or a square shape. The end surface is provided with a convex structure, and a connecting portion of the end surface and the supporting body is provided with a supporting end stepped structure.

As an improvement of the present invention, connecting portions between two ends of the supporting main body and the supporting ends are each provided with a supporting body stepped structure. The supporting body stepped structure is matched with the supporting end stepped structure to form the stepped transition assembly. The supporting body is provided with radially extending "stepped" edge on each connecting portion with the supporting ends at two sides to match with the "stepped" structure on the supporting ends. The supporting body may be made of plastic, such as one material selected from POM, HDPE, PA, PPA, PBT, PPS, PEEK or stainless steel metal, and the supporting ends may also be made of plastic, such as HDPE.

As an improvement of the present invention, the supporting main body is provided with grooves, and the grooves are V-shaped, U-shaped, or semicircle-shaped. The supporting main body is provided with an opening hole on each of the two sides at a position near an end portion, so as to ensure an inflow and an outflow of a liquid inside the hollow tank body, and thus a small liquid storage space inside the hollow body is occupied. The hollow cylinder may also be provided with a plurality of holes penetrating through the cylinder body along a plurality of circles around the cylinder. The structure arrangement of grooves and penetrating holes on the hollow cylinder can ensure that the stresses are centralized at the position of the grooves and the penetrating holes and the tank body will thus get broken first when the tank body falls down. By doing so, the case where a connecting portion of the supporting structure and a wall of the tank body gets fractured can be avoided, and the integrity of the wall of the tank body can be ensured. If the wall of the tank body is torn, fuel stored inside the tank will leak, which is prone to cause a serious accident.

A forming method for a hollow tank body having a supporting assembly characterizes in that the method includes the following steps:

1) loading a material to a two-neck mold device;
2) moving a preforming mold device to a middle of a mold;
3) after the material is loaded in place, closing half molds of the mold and the preforming mold, and performing a high-pressure blow molding to preform a housing body;
4) after preforming the high-pressure blow molding and preforming for a period of time, opening the mold;
5) removing the preforming mold device from the middle, while an assembly built-in mechanism enters a designated position in the middle of the mold;
6) connecting an end surface of a connecting component on one side of an internal connecting structure to a designated position of a parison by the assembly built-in mechanism;
7) removing the assembly built-in mechanism;
8) closing the mold again, and connecting an end surface of a connecting component on the other side of the internal connecting structure to a designated position of a parison at the other side;
9) performing a high pressure blowing to complete a final molding of the hollow tank body; and
10) opening the mold and taking out a product.

As an improvement of the present invention, the internal connecting structure in the step (6) includes a supporting assembly and a wave-proof plate structure. When the supporting assembly is connected to the inner wall of the hollow tank body through the assembly built-in mechanism, the end surface of the connecting component on one side of the supporting assembly can be preheated in advance, so as to ensure a sufficient connection with the inner wall of the hollow tank body.

Compared with the prior art, the present invention has the following advantages. 1) The supporting body of the supporting assembly of hollow tank body has a hollow cylindrical structure, the structure will not get deformed under the action of external pressure for a long time, the structure is easy to be formed, and there are less requirements for developing molding tools, so that it is timesaving and cost saving. 2) A plurality of circular grooves are distributed on the cylindrical supporting main body, and these grooves may be V-shaped, U-shaped or semicircle-shaped. In addition, the supporting body is provided with opening holes at the positions near the ends of both sides, so as to ensure the inflow and outflow of the liquid inside the hollow tank and a small liquid storage space inside the hollow body is occupied. The hollow cylinder may also be provided with a plurality of holes penetrating through the cylinder body along a plurality of circles around the hollow cylinder. The structure arrangement of grooves and penetrating holes on the hollow cylinder can ensure that the stresses are centralized at the position of the grooves and the penetrating holes and the tank body thus get broken first when the tank body falls down. By doing so, the case where a connecting portion of the supporting structure and a wall of the tank body gets fractured can be avoided, and the integrity of the wall of the tank body can be ensured. If the wall of the tank body is torn, fuel stored inside the tank will leak, which is prone to cause a serious accident. 3) The supporting body is provided with radially extending "stepped" edges on the connecting portions with the supporting ends at two sides to match with the "stepped" structure on the supporting ends. Through holes are arranged on the edge with the same interval. When the supporting body is connected to the supporting ends, a part of molten material on the supporting end can pass through these through holes to form a protrusion structure after the molten material is cooled, so the connection strength between the supporting ends and the supporting body is further improved. 4) The technical solution is cost saving and convenient for widespread use in a large scale.

Figure 1:
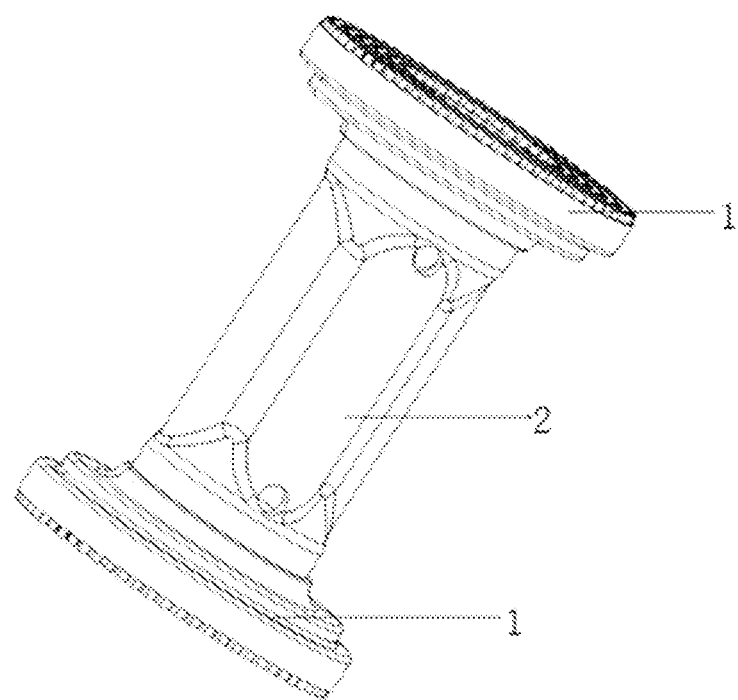
FIG. 1 is a schematic diagram of a supporting structure of the present invention.
Figure 2:
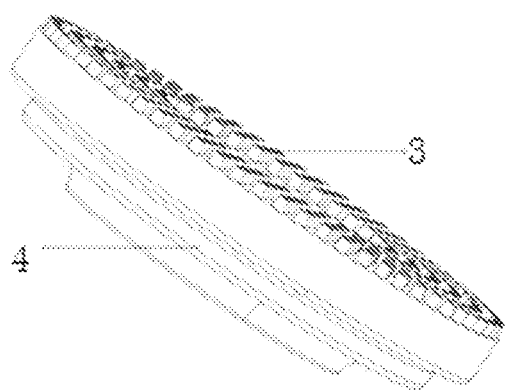
FIG. 2 is a structural schematic diagram of a supporting end of the present invention.

In the figures: 1 —supporting end, 2—supporting body, 3—convex structure, 4—supporting end stepped structure, 5—supporting main body, 6—base, 7—base hole, 8—groove, 9—opening hole, 10—half mold, 11—preforming mold, 14—assembly built—in mechanism, 15—supporting body stepped structure, and 16—cylinder with corrugated structure.

DETAILED DESCRIPTION OF THE EMBODIMENTS

For the sake of further understanding and recognizing the present invention, the present invention will be further described and explained with reference to the embodiments.

Embodiment 1

Referring to FIGS. 1-5, a supporting assembly for a hollow tank body includes a supporting body 2 and supporting ends 1 provided at two ends of the supporting body. The supporting ends are provided with stepped transition assemblies connected to the support body. The supporting body 2 is configured with a hollow structure. The supporting body includes a supporting main body 5 and a base 6. Each supporting end 1 includes an end surface of circular, elliptical or square shape. The end surface is provided with a convex structure 3, and the number of the convex structure and the cross-sectional size of each convex structure are configured according to the actual demands of connection strength. The structural design enables the supporting ends to be connected to the wall of the housing body in a simple and fast way, and minimum product materials are required while the high-strength connection performance is satisfied, thereby realizing the objectives of high performance, low cost, and light weight. The supporting body in the technical solution is configured with a hollow structure, so it has a light weight, stable structure, and needs less materials consumption. Also, the structure can resist the deformation of the hollow tank body under the relatively high overpressure and the low negative pressure.

Embodiment 2

Figure 3:
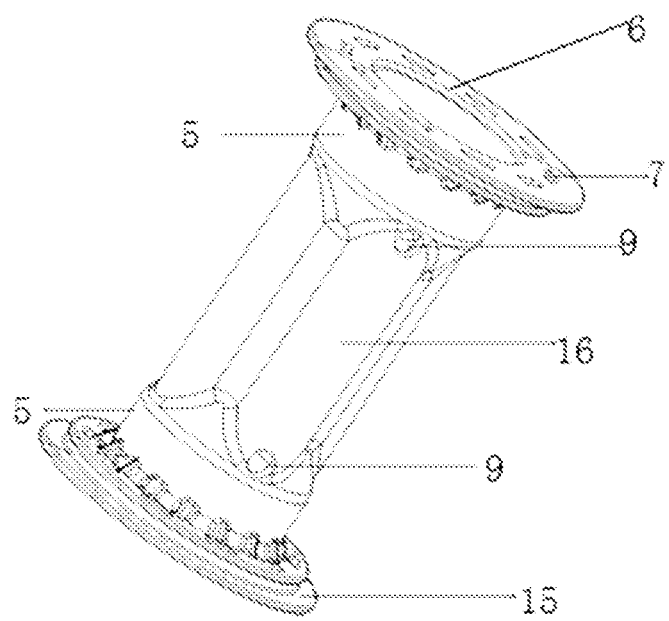
FIGS. 3-5 are structural schematic diagrams showing different supporting bodies of the present invention.

Referring to FIG. 3, as an improvement of the present invention, the supporting main body 5 is configured with a cylindrical structure or a cylindrical structure with a corrugated structure in the middle. The structure the will not get deformed under the action of external pressure for a long time and is easy to be formed. Accordingly, there are less requirements for developing the molding tools, and time and costs can be saved.

Embodiment 3

Referring to FIG. 3, as an improvement of the present invention, the base 6 is configured with a round shape, an elliptical shape or a square shape, and the base is provided with base holes 7. The edge is arranged with through holes at the same interval. When the base 6 is connected to the supporting ends, a part of molten material on the supporting ends may pass through the through holes to form a protrusion structure after the molten material is cooled, thereby further improving the connection strength between the supporting ends and the supporting body.

Embodiment 4

Referring to FIG. 3, as an improvement of the present invention, a connecting portion of the end surface and the supporting body is provided with a supporting end stepped structure 4. The supporting main body is provided with supporting body stepped structures 15 on the connection portions with the supporting ends at two sides, and the supporting body stepped structure is matched with the supporting end stepped structure to form a stepped transition assembly. The supporting body is provided with radially extending "stepped" edge on the connecting portions with the supporting ends at the two sides to match with the "stepped" structures on the supporting ends. With this design, the contact surface between the supporting ends and the supporting body is increased, while the product materials are saved. The supporting ends are covered on the two sides of the supporting body by an injection molding process. The structural design can increase the connection strength between the supporting ends and the supporting body while reducing the weight of the product.

Embodiment 5

Figure 4:
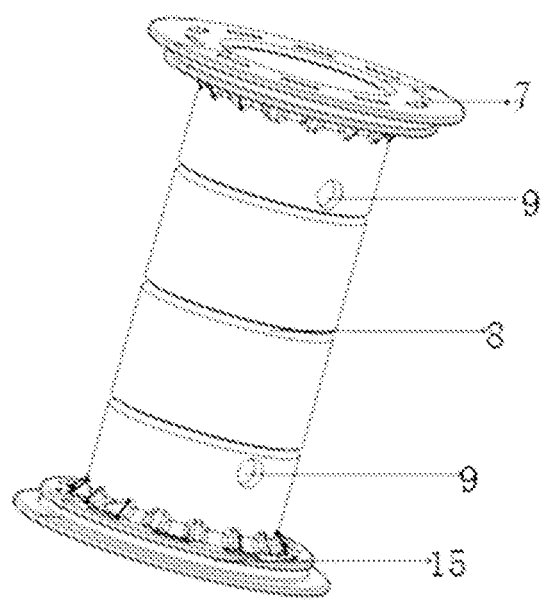
Figure 5:
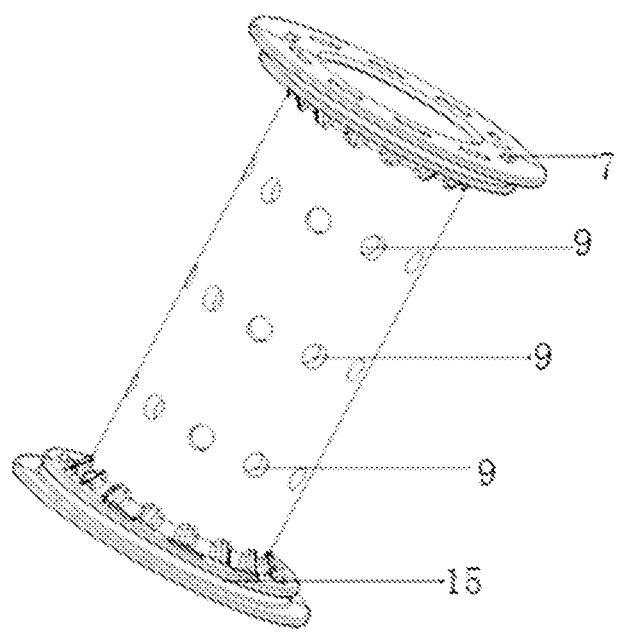

Referring to FIG. 4, as an improvement of the present invention, The supporting main body is provided with grooves 8, and the grooves are V-shaped, U-shaped or semicircle-shaped. The supporting main body is provided with opening holes 9 at positions near the end portions of the two sides, thereby ensuring an inflow and an outflow of a liquid inside the hollow tank body, and a small inner liquid storage space of the hollow body is occupied. The hollow cylinder may also be provided with a plurality of opening holes penetrating through the cylinder body along a plurality of circles around the cylinder, see FIG. 5. The structure arrangement of grooves and penetrating holes on the hollow cylinder can ensure that the stresses are centralized at the position of the grooves and the penetrating holes where will thus get broken first when the tank body falls down. By doing so, the case where a connecting portion of the supporting structure and a wall of the tank body gets fractured can be avoided, and the integrity of the wall of the tank body can be ensured. If the wall of the tank body is torn, fuel stored inside the tank will leak, which is prone to cause a serious accident. The supporting body may be made of plastic such as POM, HDPE, PA, PPA, PBT, PPS, PEEK or stainless steel metal, and the supporting ends may also be made of plastic such as HDPE, which will facilitate the connection with the upper and lower walls of the fuel tank.

Embodiment 6

Figure 6:
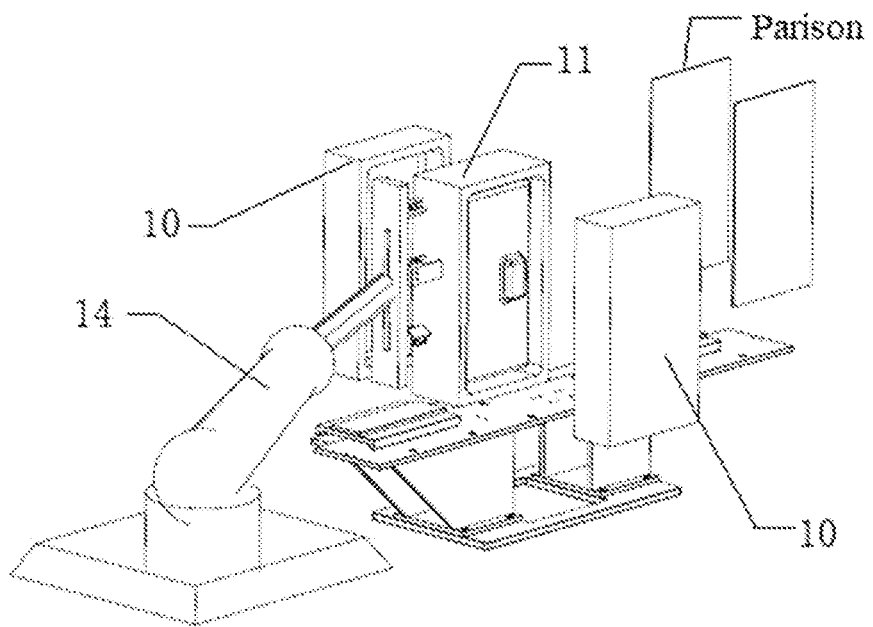
FIGS. 6-10 are schematic diagrams showing the production process of two parisons.
Figure 7:
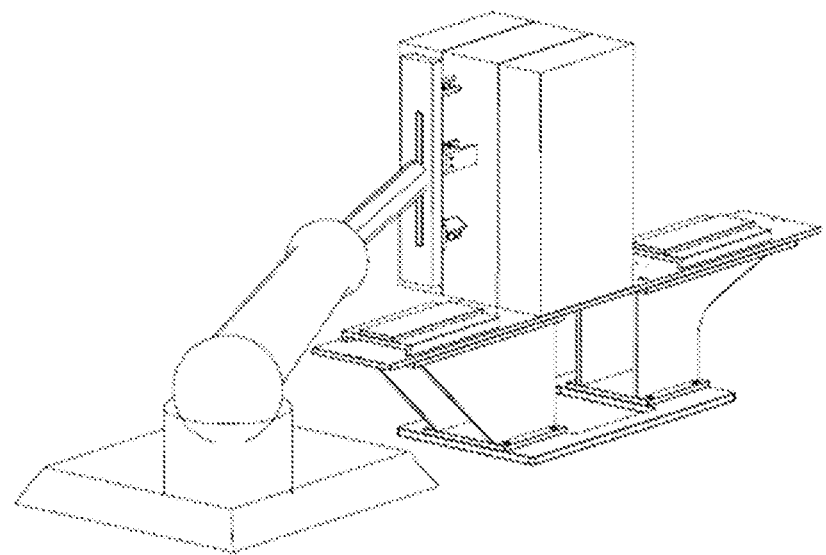
Figure 8:
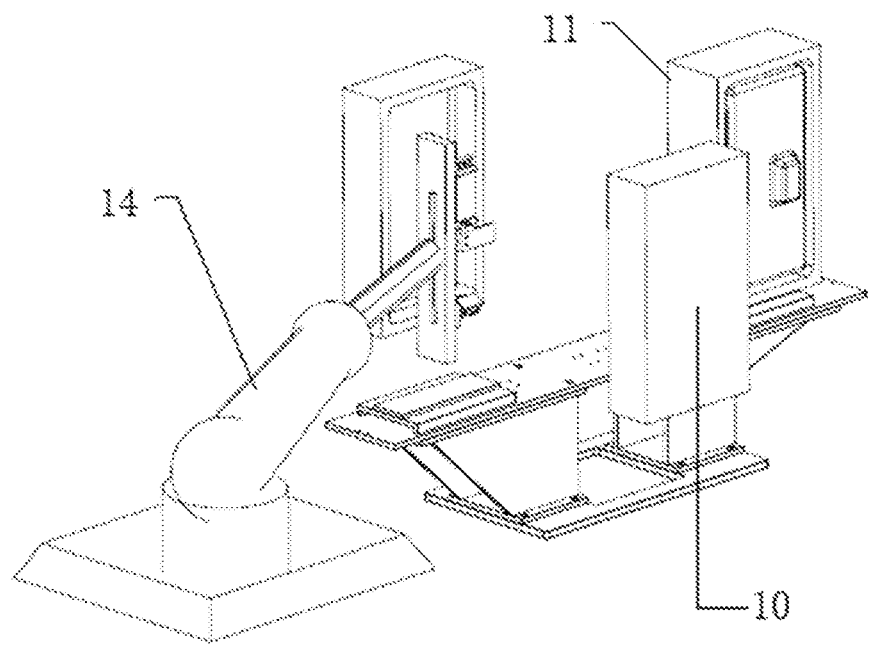
Figure 9:
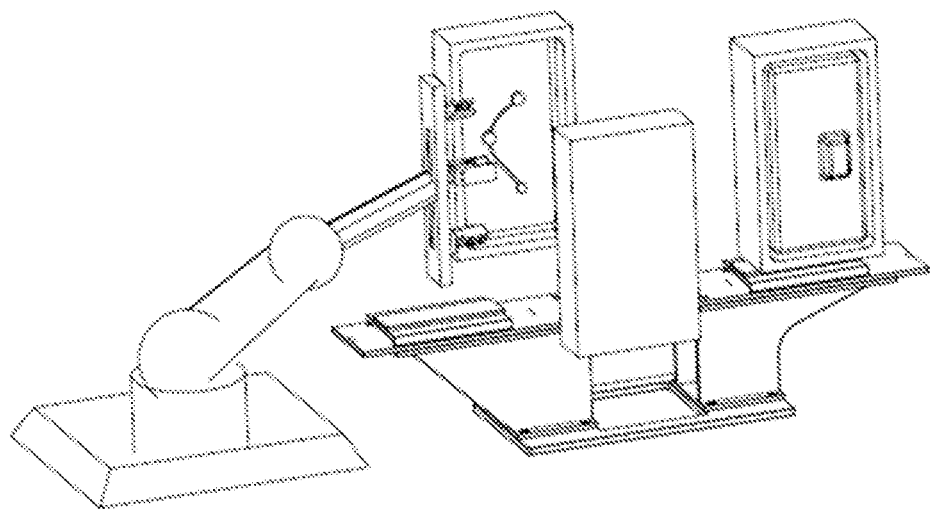
Figure 10:
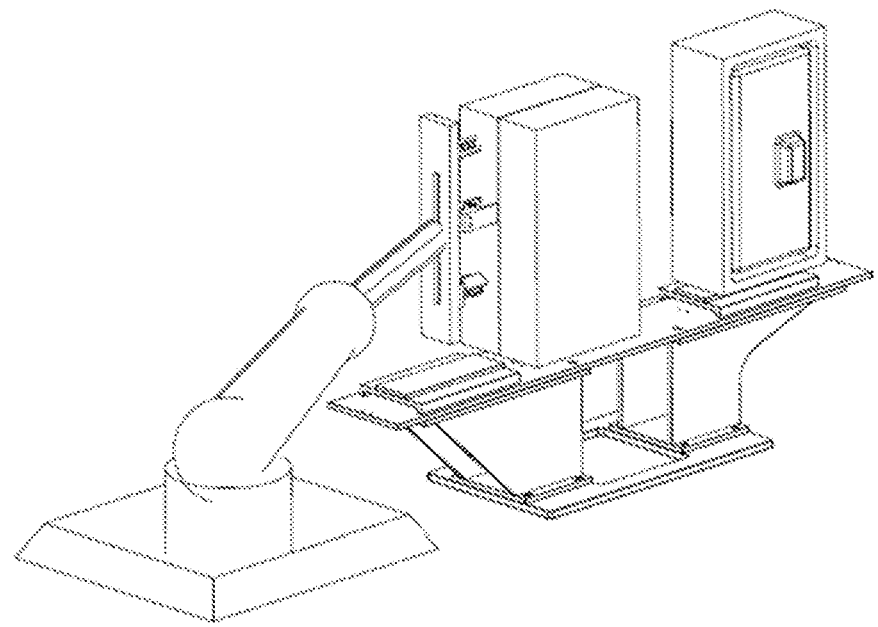

Referring to FIGS. 6-10, a forming method for a hollow tank body having a supporting assembly includes the following steps:

1) loading a material to a two-neck mold device, see FIG. 6;

2) moving a preforming mold device to a middle of a mold, see FIG. 7;

3) after the material is loaded in place, closing half molds 10 of the mold and the preforming mold 11, and performing a high-pressure blow molding to preform a housing body, see FIG. 7;

4) after preforming the high-pressure blow molding and preforming, opening the mold, see FIG. 8;

5) removing the preforming mold device 11 from the middle, while an assembly built-in mechanism enters a designated position in the middle of the mold, see FIG. 9;

6) connecting an end surface of a connecting component on one side of an internal connecting structure to a designated position of a parison by the assembly built-in mechanism; the action of placing the internal connection structure may also be completed by a robot, see FIG. 9;

7) removing the assembly built-in mechanism, see FIG. 10;

8) closing the mold again, and connecting an end surface of a connecting component on the other side of the internal connecting structure to a designated position of a parison at the other side;

9) performing a high pressure blowing to complete a final molding of the hollow tank body; and 10) opening the mold and taking out a product.

The internal connecting structure in step (6) includes a supporting assembly and a wave-proof plate structure. When the supporting assembly is connected to the inner wall of the hollow tank body through the assembly built-in mechanism, the end surface of the connecting component on one side of the supporting assembly can be preheated in advance, so as to ensure a sufficient connection with the inner wall of the hollow tank body.

According to the present invention, the technical features described in Embodiments 2, 3, 4, and 5 may also be combined with Embodiment 1 to form a new embodiment.

It should be noted that the above embodiments are not intended to limit the scope of the present invention, and those equivalent changes or substitutions derived on the basis of the above technical solutions should all be considered as falling within the scope defined by the appended claims of the present invention.

What is claimed is:

1. A supporting assembly for a hollow tank body, comprising a supporting body and supporting ends provided at two ends of the supporting body, wherein each supporting end is provided with a stepped transition assembly connected to the supporting body, and a supporting main body is provided with grooves, wherein the grooves are V-shaped, U-shaped, or semicircle-shaped.

2. The supporting assembly for the hollow tank body of claim 1, wherein the supporting body is configured with a hollow structure.

3. The supporting assembly for the hollow tank body of claim 1, wherein the supporting body comprises a supporting main body and a base.

4. The supporting assembly for the hollow tank body of claim 3, wherein the supporting main body is configured with a cylindrical structure or a cylindrical structure with a corrugated structure in a middle.

5. The supporting assembly for the hollow tank body of claim 4, wherein the base is configured with a round shape, an elliptical shape, or a square shape and the base is provided with base holes.

6. The supporting assembly for the hollow tank body of claim 1, wherein each supporting end comprises an end surface of a round shape, an elliptical shape, or a square shape, the end surface is provided with a convex structure, a connecting portion of the end surface and the supporting body is provided with a supporting end stepped structure.

7. The supporting assembly for the hollow tank body of claim 6, wherein connecting portions between two ends of the supporting main body and the supporting ends are each provided with a supporting body stepped structure, and the supporting body stepped structure is matched with the supporting end stepped structure to form the stepped transition assembly.

8. The supporting assembly for the hollow tank body of claim 1, wherein the supporting main body is provided with an opening hole on each of the two sides at a position near an end portion of the supporting main body, the supporting main body is made of a material selected from anyone of POM, HDPE, PA, PPA, PBT, PPS, PEEK and stainless steel metal, and the supporting ends are made of HDPE.

9. A forming method for forming a hollow tank body having a supporting assembly, the supporting assembly comprising a supporting body and supporting ends provided at two ends of the supporting body, wherein each supporting end is provided with a stepped transition assembly connected to the supporting body, and wherein a supporting main body is provided with grooves, and the grooves are V-shaped, U-shaped, or semicircle-shaped, the method comprising:
   1) loading a material to a two-neck mold device;
   2) moving a preforming mold device to a middle of a mold of the two-neck mold device;
   3) after the material is loaded in place, closing half molds of the mold and the preforming mold, and performing a high-pressure blow molding to preform a housing body;
   4) after preforming the high-pressure blow molding and preforming for a period of time, opening the mold;
   5) removing the preforming mold device from the middle, while an assembly built-in mechanism enters a designated position in the middle of the mold;
   6) connecting an end surface of one of the supporting ends on one side of the supporting assembly to a first designated position of a first parison at one side of the middle of the mold by the assembly built-in mechanism;
   7) removing the assembly built-in mechanism;
   8) closing the mold again, and connecting the other supporting end of the supporting assembly on the other side of the supporting body to a second designated position of a second parison at the other side of the middle of the mold;
   9) performing a high pressure blowing to complete a final molding of the hollow tank body; and
   10) opening the mold and taking out a product.

10. The forming method for the hollow tank body of the supporting assembly of claim 9, wherein the internal connection structure in step (6) comprises the supporting assembly and a wave-proof plate structure, wherein when the supporting assembly is connected to an inner wall of the hollow tank body through the assembly built-in mechanism, an end surface of the connecting component on one side of the supporting assembly is preheated in advance to ensure a sufficient connection with the inner wall of the hollow tank body.

11. The supporting assembly for the hollow tank body of claim 2, wherein the supporting body comprises a supporting main body and a base.

12. The supporting assembly for the hollow tank body of claim 2, wherein each supporting end comprises an end surface of a round shape, an elliptical shape, or a square shape, the end surface is provided with a convex structure, a connecting portion of the end surface and the supporting body is provided with a supporting end stepped structure.

13. The supporting assembly for the hollow tank body of claim 2, wherein the supporting main body is provided with an opening hole on each of the two sides at a position near an end portion of the supporting main body, the supporting main body is made of a material selected from anyone of POM, HDPE, PA, PPA, PBT, PPS, PEEK and stainless steel metal, and the supporting ends are made of HDPE.

14. The forming method of claim 9, wherein the supporting body is configured with a hollow structure.

15. The forming method of claim 9, wherein the supporting body comprises a base.

16. The forming method of claim 9, wherein the supporting main body is configured with a cylindrical structure or a cylindrical structure with a corrugated structure in a middle.

17. The forming method of claim 9, wherein the base is configured with a round shape, an elliptical shape, or a square shape, and the base is provided with base holes.

18. The forming method of claim 9, wherein each supporting end comprises an end surface of a round shape, an elliptical shape, or a square shape, the end surface is provided with a convex structure, a connecting portion of the end surface and the supporting body is provided with a supporting end stepped structure.

19. The forming method of claim 18, wherein connecting portions between two ends of the supporting main body and the supporting ends are each provided with the supporting body stepped structure, and the supporting body stepped structure is matched with the supporting end stepped structure to form the stepped transition assembly.

20. The forming method of claim 9, wherein the supporting main body is provided with an opening hole on each of the two sides at a position near an end portion of the supporting main body, the supporting main body is made of a material selected from anyone of POM, HDPE, PA, PPA, PBT, PPS, PEEK and stainless steel metal, and the supporting ends are made of HDPE.

* * * * *